United States Patent
Kimura et al.

(10) Patent No.: US 11,494,958 B2
(45) Date of Patent: Nov. 8, 2022

(54) CONTROL DEVICE, PRESENTATION SYSTEM, AND COMPUTER READABLE NON-TRANSITORY STORAGE MEDIUM

(71) Applicant: KABUSHIKI KAISHA TOKAI RIKA DENKI SEISAKUSHO, Aichi (JP)

(72) Inventors: Aya Kimura, Aichi (JP); Masahiko Miyata, Aichi (JP); Makoto Harazawa, Aichi (JP); Takeshi Ohnishi, Aichi (JP)

(73) Assignee: KABUSHIKI KAISHA TOKAI RIKA DENKI SEISAKUSHO, Aichi (JP)

(*) Notice: Subject to any disclaimer, the term of this patent is extended or adjusted under 35 U.S.C. 154(b) by 0 days.

(21) Appl. No.: 17/496,307

(22) Filed: Oct. 7, 2021

(65) Prior Publication Data

US 2022/0114775 A1  Apr. 14, 2022

(30) Foreign Application Priority Data

Oct. 13, 2020 (JP) .............. JP2020-172384

(51) Int. Cl.
*G06T 11/40* (2006.01)
*G09G 3/00* (2006.01)

(52) U.S. Cl.
CPC ........... *G06T 11/40* (2013.01); *G09G 3/03* (2020.08)

(58) Field of Classification Search
CPC .......... G08G 1/16; G08G 1/166; G08G 1/167; G05D 1/0061; B60W 50/08; B60W 50/14; B60W 50/146; B60W 60/0053; B62D 1/286
See application file for complete search history.

(56) References Cited

U.S. PATENT DOCUMENTS

| | | | |
|---|---|---|---|
| 2018/0113454 A1* | 4/2018 | Emura | B60W 50/14 |
| 2019/0122525 A1* | 4/2019 | Lancelle | B60Q 9/00 |
| 2022/0009524 A1* | 1/2022 | Oba | B60W 60/0061 |
| 2022/0081009 A1* | 3/2022 | Oba | B60W 60/0053 |

FOREIGN PATENT DOCUMENTS

JP   2018-005362   1/2018

* cited by examiner

*Primary Examiner* — Priyank J Shah
(74) *Attorney, Agent, or Firm* — Greenblum & Bernstein P.L.C.

(57) ABSTRACT

A control device includes a control unit that controls such that visual information is continuously presented from a first position to a second position, which is different from the first position, when a first state in which an operation target, which is a target to be operated by a user, is operated by an operation executing unit that operates the operation target, instead of the user, is switched to a second state in which the operation target is operated by the user.

16 Claims, 6 Drawing Sheets

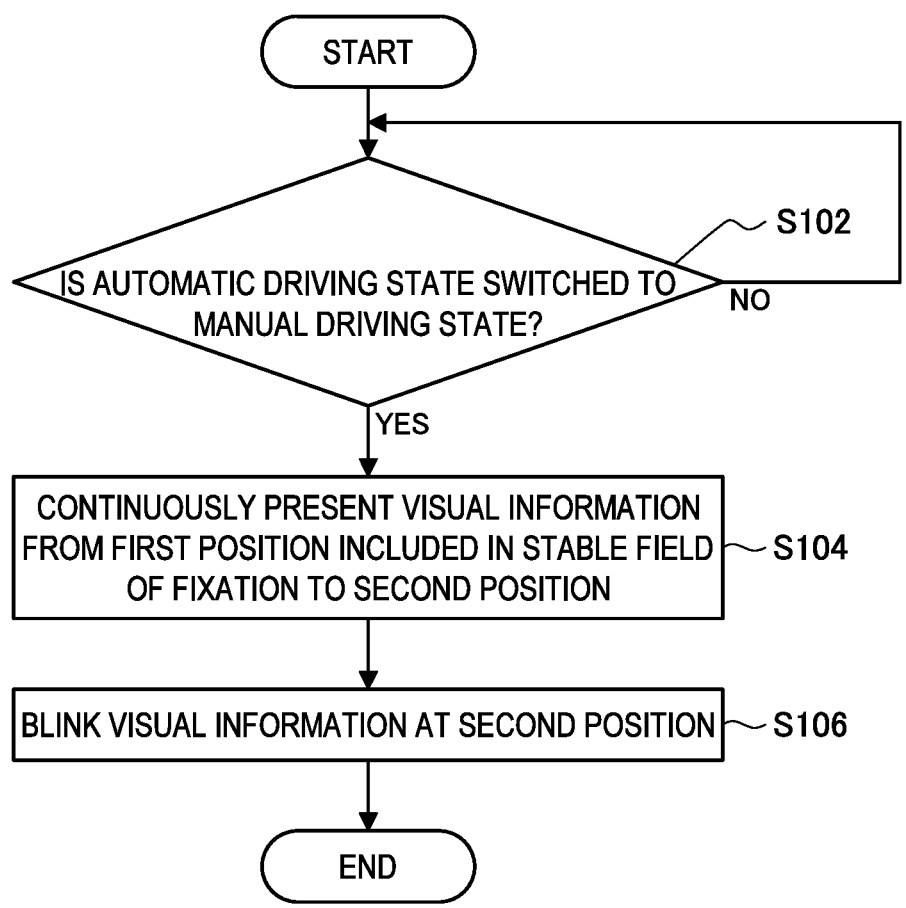

CONTROL DEVICE, PRESENTATION SYSTEM, AND COMPUTER READABLE NON-TRANSITORY STORAGE MEDIUM

CROSS REFERENCE TO RELATED APPLICATION(S)

This application is based upon and claims benefit of priority from Japanese Patent Application No. 2020-172384, filed on Oct. 13, 2020, the entire contents of which are incorporated herein by reference.

BACKGROUND

The present invention relates to a control device, a presentation system, and a computer readable non-transitory storage medium.

Levels 0 to 5 are defined as levels of automatic driving. It is known that as a level of automatic driving increases, less tasks are imposed on a user during execution of automatic driving, and thus a driver's attention to driving tends to decrease. Therefore, there is a demand for a technology that enhances safety when automatic driving is switched to manual driving. Regarding this point, for example, JP 2018-005362A discloses a technology for accurately grasping a driver's consciousness of driving during execution of automatic driving.

SUMMARY

However, it is only a short time since a technology disclosed in JP 2018-005362A or the like was developed, and there is still room for improvement in safety related to automatic driving.

Therefore, the present invention has been made in view of the above problems, and an object of the present invention is to provide a structure capable of further improving safety.

To solve the above described problem, according to an aspect of the present invention, there is provided a control device comprising: a control unit that controls such that visual information is continuously presented from a first position to a second position which is different from the first position when a first state in which an operation target which is a target to be operated by a user is operated by an operation executing unit that operates the operation target instead of the user is switched to a second state in which the operation target is operated by the user.

To solve the above described problem, according to another aspect of the present invention, there is provided a presentation system comprising: a lighting device that emits light; and a control device that controls the lighting device such that visual information is continuously presented from a first position to a second position which is different from the first position when a first state in which an operation target which is a target to be operated by a user is operated by an operation executing unit that operates the operation target instead of the user is switched to a second state in which the operation target is operated by the user.

To solve the above described problem, according to another aspect of the present invention, there is provided a computer readable non-transitory storage medium in which a program is stored, the program causing a computer to execute controlling such that visual information is continuously presented from a first position to a second position which is different from the first position when a first state in which an operation target which is a target to be operated by a user is operated by an operation executing unit that operates the operation target instead of the user is switched to a second state in which the operation target is operated by the user.

As described above, according to the present invention, a structure capable of further improving safety is provided.

BRIEF DESCRIPTION OF THE DRAWINGS

FIG. 6 is a diagram showing an example of a flow of processing executed by a presentation system according to the present embodiment.

DETAILED DESCRIPTION OF THE EMBODIMENT(S)

Figure 1:
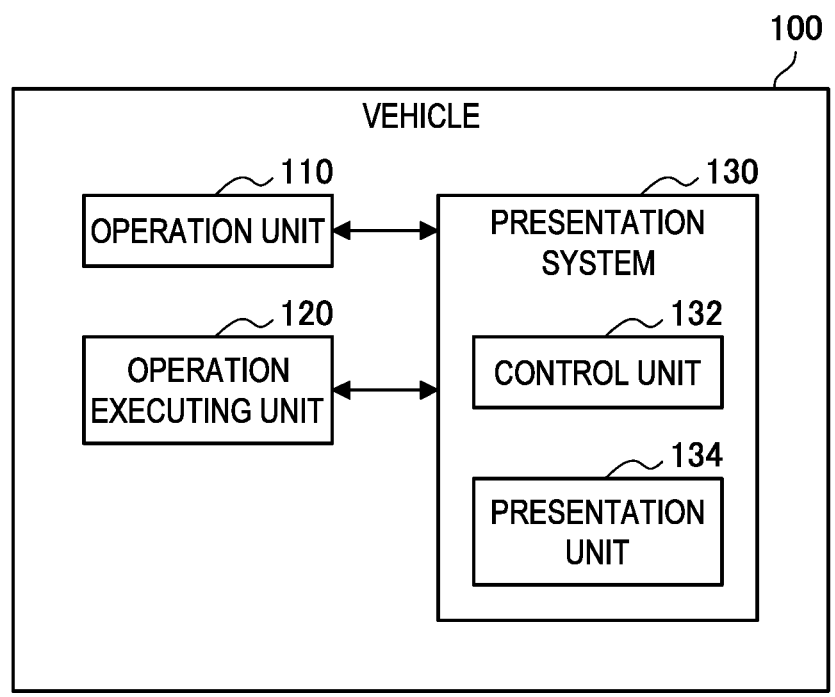
FIG. 1 is a diagram showing an example of a logical configuration of a vehicle according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

<<1. Configuration Example>>

FIG. 1 is a diagram showing an example of a logical configuration of a vehicle 100 according to an embodiment of the present invention. As shown in FIG. 1, the vehicle 100 according to the present embodiment includes an operation unit 110, an operation executing unit 120, and a presentation system 130. The vehicle 100 is an example of an operation target which is a target to be operated by a user. The user is a driver who drives the vehicle 100.

The operation unit 110 is a device used by the driver to operate the vehicle 100. An example of the operation unit 110 is a steering wheel for operating a traveling direction of the vehicle 100. Another example of the operation unit 110 is an accelerator pedal for accelerating the vehicle 100. Another example of the operation unit 110 is a brake pedal for decelerating the vehicle 100.

The operation executing unit 120 has a function of operating the vehicle 100 instead of the driver. The operation executing unit 120 is a device that executes so-called automatic driving. The operation executing unit 120 controls a traveling direction and a speed of the vehicle 100 based on various items of information such as an image of the surrounding of the vehicle 100, sounds of the surroundings of the vehicle 100, and a current speed and a current traveling direction of the vehicle 100 which are obtained by various sensors provided in the vehicle 100, for example. The operation of the vehicle 100 by the operation executing unit 120 instead of the driver operating the vehicle 100 using the operation unit 110 is also referred to as automatic driving below. The operation executing unit 120 is constituted by, for example, an engine control unit (ECU).

The presentation system 130 has a function of presenting various items of information to the driver. The presentation system 130 includes a control unit 132 and a presentation unit 134.

The presentation unit 134 is a device that outputs a stimulus to the driver. An example of the stimulus is a visual stimulus which is a stimulus perceived by a visual sense. The presentation unit 134 may include a lighting device that emits light as the visual stimulus. An example of the lighting device is an indicator constituted by a light emitting diode (LED) or the like. The lighting device may be a projector, a display, or the like that displays an image as the visual stimulus.

The control unit 132 functions as a control device and controls the overall operation in the vehicle 100 according to various programs. The control unit 132 is realized by, for example, an electronic circuit such as an ECU and a microprocessor. The control unit 132 may include a read only memory (ROM) for storing programs to be used, calculation parameters, and the like, and a random access memory (RAM) for temporarily storing parameters and the like that change as appropriate.

<<2. Technical Features>>

(1) Visual Field of Driver

Figure 2:
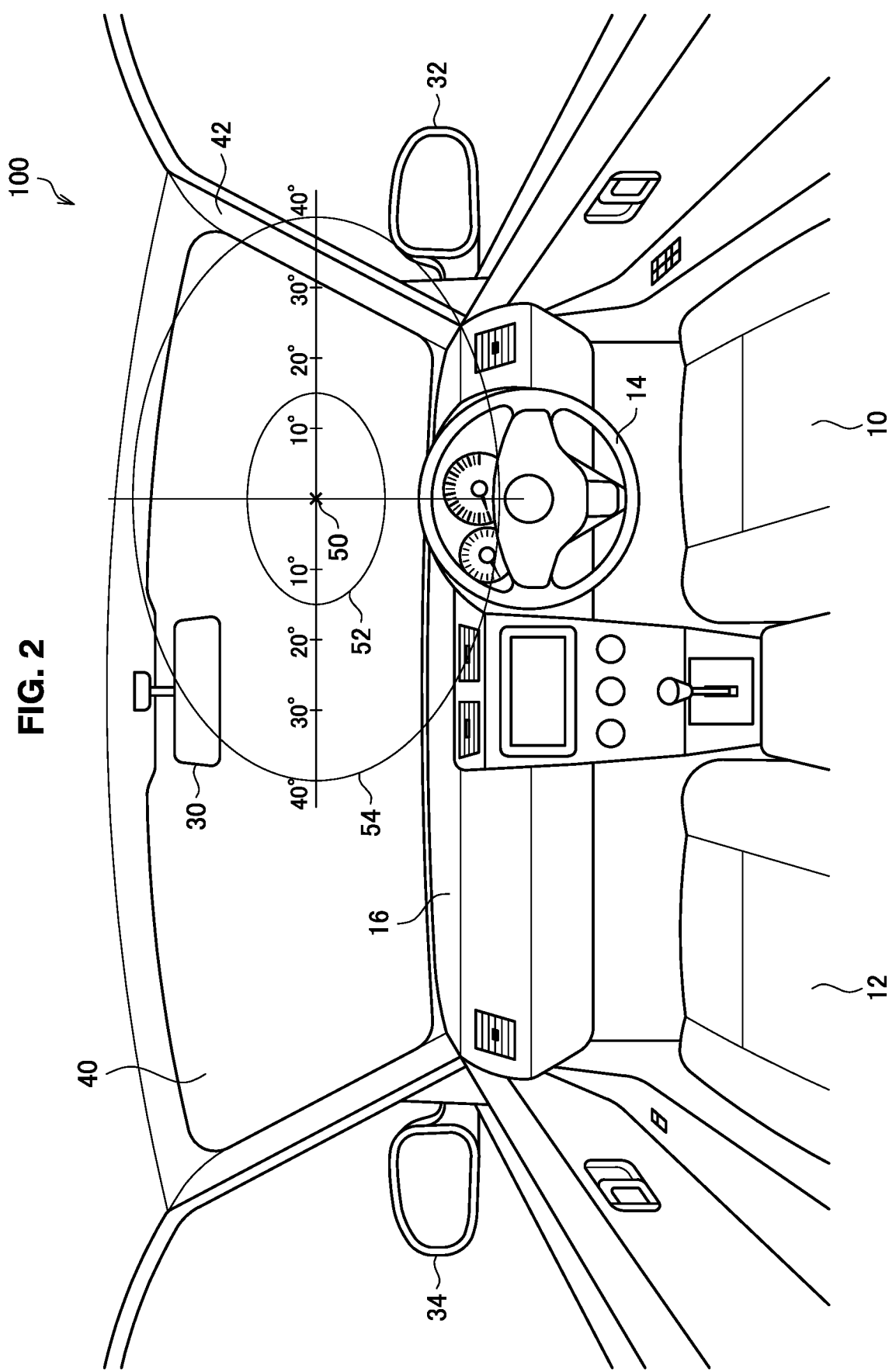
FIG. 2 is a view for explaining an example of a visual field of a driver driving a vehicle.

FIG. 2 is a view for explaining an example of a visual field of the driver driving the vehicle 100. As shown in FIG. 2, various facilities such as a driver seat 10, a passenger seat 12, and a steering wheel 14 are disposed in a vehicle interior of the vehicle 100. The driver sits on the driver seat 10 and operates the steering wheel 14 to drive the vehicle 100 while monitoring the surroundings of the vehicle 100 centered on the forward.

An instrument panel 16 is disposed on a front side of the vehicle interior. The instrument panel 16 is provided with various facilities such as meters such as a speedometer, a car navigation system, and a switch for operating an air conditioner (AC) facility.

The vehicle 100 is provided with a rear-view mirror 30, a side mirror 32 on a driver seat side, and a side mirror 34 on a passenger seat side as devices for supporting the surroundings monitoring of the driver. The driver can visually recognize the rearward of the vehicle 100 by the rear-view mirror 30. The driver can visually recognize the right rearward of the vehicle 100 by the side mirror 32 on a driver seat side. The driver can visually recognize the left rearward of the vehicle 100 by the side mirror 34 on a passenger seat side.

The vehicle interior is partitioned from a space outside the vehicle by windows such as a windshield 40 and window frames called pillars. Each of the plurality of pillars provided in the vehicle 100 may be distinguished by a letter such as an A pillar, a B pillar, and a C pillar from the front of the vehicle 100. A front pillar 42 on a driver seat side of the vehicle 100 is also referred to as an A pillar on a driver seat side.

A visual field of the driver extends vertically and horizontally around a center of vision 50 of the driver. The center of vision 50 is a center of the visual field of the driver. The visual field of the driver is classified into an effective visual field 52, a stable field of fixation 54, and a surroundings visual field (not shown). The effective visual field 52 is a range that contributes to recognition. As an example, the effective visual field 52 is defined as a range of 15 degrees in left and right directions from the center of vision 50. The stable field of fixation 54 is a range in which the visual field can be seen smoothly and stably. As an example, the stable field of fixation 54 is defined as a range within 45 degrees in the left and right directions from the center of vision 50. The surroundings visual field is a range in which a visual stimulus can be detected. It is known that a moving visual stimulus (hereinafter also referred to as a movement stimulus) is easily detected in the surroundings visual field. As an example, the surroundings visual field is defined as a range of a total of 210 degrees in the left and right directions from the center of vision 50. The range of the visual field can fluctuate depending on the degree of concentration of attention of the driver. For example, the stable field of fixation 54 may be a range within 30 degrees from the center of vision at its narrowest.

The center of vision 50 shown in FIG. 2 is a center of the visual field when the driver is monitoring the forward in an own lane. The own lane is a lane in which the vehicle 100 is currently traveling. A position of the center of vision 50 is estimated to be in front of the vehicle 100, for example, with reference to a central position of a headrest of the driver seat 10. In that case, as shown in FIG. 2, the effective visual field 52 includes a space in front of the vehicle 100 which is visible through the windshield 40. Further, as shown in FIG. 2, the stable field of fixation 54 includes the A pillar 42 on a driver seat side, a portion of the rear-view mirror 30 near the driver seat 10, and an upper portion of the instrument panel 16 in addition to the space in front of the vehicle 100.

(2) Technical Issues

During manual driving, the driver constantly monitors the surroundings and grasps the situation while performing the steering wheel operation, the accelerator operation, and the brake operation. In particular, the driver widely monitors not only the situation of the forward in the own lane but also the situation of the surroundings such as situations of a shoulder, a sidewalk, the rearward in the own lane, and a lane adjacent to the own lane.

However, it is known that as a level of automatic driving increases, fewer tasks are imposed on a user during execution of automatic driving, and thus a driver's attention to driving tends to decrease. For example, during automatic driving, surroundings monitoring by the driver may be neglected. Then, when automatic driving is switched to manual driving, the driver's consciousness is divided into the steering wheel operation, the accelerator operation, and the brake operation, and there is a concern that the surroundings monitoring may be neglected.

As a technology for supporting the surroundings monitoring, there is a technology called a blind spot monitor (BSM). The BSM is a technology that alerts the driver by lighting an indicator provided on a mirror surface of the side mirror in a case in which another vehicle approaching from a blind spot of the side mirror is detected.

However, the BSM is not a technology originally developed to support surroundings monitoring when automatic driving is switched to manual driving. Therefore, it is conceivable that even if BSM is used when automatic driving is switched to manual driving, its effect may be limited. This is because the driver may not notice the indicator. In a busy situation when the automatic driving is switched to the manual driving, it is likely that the driver will not notice the indicator.

(3) Guiding Visual Line of Driver

Therefore, the presentation system 130 according to the present embodiment guides a visual line of the driver to a position where the driver should gaze using bottom-up type attention. Bottom-up type attention is that in which attention is passively attracted to a stimulus itself in a case in which one stimulus is significantly different from surrounding stimuli among multiple stimuli, or in a case in which a visual stimulus suddenly appears.

Specifically, the control unit 132 controls the presentation unit 134 such that visual information is continuously presented from a first position to a second position which is different from the first position when an automatic driving state is switched to a manual driving state. For example, the control unit 132 moves the visual information from the first position to the second position. According to such a configuration, the visual information is continuously presented from the first position to the second position as a stimulus significantly different from the surrounding stimulus, and thus the visual line of the driver can be guided to the second position using the bottom-up type attention. Therefore, the control unit 132 can prompt the driver to perform the surroundings monitoring, which tends to be neglected, by setting the position where the driver should gaze to the second position. In this way, it is possible to enhance safety when the automatic driving state is switched to the manual driving state.

The automatic driving state is a state in which the automatic driving is being executed. More specifically, the automatic driving state is a state in which the vehicle 100 is operated by the operation executing unit 120. The automatic driving state is an example of a first state in the present embodiment. In the manual driving state, the automatic driving is not executed. More specifically, the manual driving state is a state in which the vehicle 100 is operated by the driver. The manual driving state is an example of a second state in the present embodiment.

The control unit 132 may perform control such that light emitted from a lighting device is presented as the visual information. As an example, a plurality of LEDs may be disposed in the vehicle 100, and the control unit 132 may cause the plurality of LEDs existing between the LED disposed in the first position and the LED disposed in the second position to emit light in order from the LED disposed in the first position to the LED disposed in the second position. As another example, a projector may be disposed in the vehicle 100, and the control unit 132 may move light projected from the projector from the first position to the second position.

The control unit 132 sets a position included in the stable field of fixation as the first position. That is, the control unit 132 starts guiding the visual line starting from within the stable field of fixation. Since the visual stimulus suddenly appears in the stable field of fixation, it is possible to attract the driver's attention to the visual information presented at the first position. Therefore, it is possible to more reliably guide the visual line of the driver.

The control unit 132 may cause the visual information to blink at the second position. For example, the control unit 132 causes the visual information to move from the first position to the second position and then the visual information to blink at the second position. According to such a configuration, it is possible to make a difference between the visual information presented at the second position and the surrounding stimulus remarkable, to attract the attention of the driver, and to guide the visual line to the second position. Furthermore, in a case in which the second position is included in the surroundings visual field, blinking visual information corresponding to the movement stimulus which is easily detected in the surroundings visual field is presented, and thus it is possible to more reliably attract the attention of the driver.

The control unit 132 may control a mode in which the visual information is blinked at the second position according to a distance between the center of vision of the user and the second position. As the mode to be controlled, a speed, intensity, color, and the like of the blinking can be considered. As an example, the control unit 132 may increase the blinking speed and the blinking intensity as the distance between the center of vision and the second position becomes longer. As another example, the control unit 132 may decrease the blinking speed and the blinking intensity as the distance between the center of vision and the second position becomes shorter. According to such a configuration, it is possible to make a difference between the visual information presented at the second position and the surrounding stimulus more significant as the second position becomes farther away from the center of vision. Therefore, it is possible to more reliably attract the attention of the driver and to guide the visual line to the second position.

The control unit 132 may control the presentation unit 134 such that the continuous presentation of the visual information from the first position to the second position is repeatedly executed. According to such a configuration, it is possible to more reliably guide the visual line of the driver.

The control unit 132 may control such that information indicating that the automatic driving state is switched to the manual driving state is notified to the user. For example, the control unit 132 performs such a notification by lighting a predetermined indicator included in the instrument panel 16 or outputting a warning sound. After the notification is performed, in a case in which predetermined conditions are satisfied, the automatic driving state is switched to the manual driving state. An example of the predetermined conditions is that input of the driver's consent is performed. Another example of the predetermined conditions is that a predetermined time has elapsed after the notification was performed.

The control unit 132 may perform control such that the visual information is presented at the same time as when the information indicating that the automatic driving state is switched to the manual driving state is notified to the user. For example, the control unit 132 may control the presentation unit 134 such that the visual information is continuously presented from the first position to the second position while the switching notification is being performed. According to such a configuration, it is possible to prompt the driver to perform the surroundings monitoring as one of preparations for the manual driving, including grasping the steering wheel 14 and the like.

The control unit 132 may control such that the visual information is presented before the information indicating that the automatic driving state is switched to the manual driving state is notified to the user. For example, the control unit 132 may control the presentation unit 134 such that the visual information is continuously presented from the first position to the second position before the switching notification is performed. According to such a configuration, it is possible to prompt the driver to perform the surroundings monitoring before the driver becomes busy preparing for the manual driving.

The control unit 132 may control such that the visual information is presented after the information indicating that the automatic driving state is switched to the manual driving state is notified to the user. For example, the control unit 132 may control the presentation unit 134 such that the visual information is continuously presented from the first position to the second position after the switching notification is performed. According to such a configuration, it is possible to prompt the driver who has prepared for the manual driving to perform the surroundings monitoring.

The control unit 132 may control such that the visual information is presented before the automatic driving state is switched to the manual driving state. For example, the control unit 132 may control the presentation unit 134 such that the visual information is continuously presented from the first position to the second position before the automatic driving state is switched to the manual driving state. According to such a configuration, it is possible to prompt the driver to perform the surroundings monitoring in a period while the automatic driving is still executed.

The control unit 132 may control such that the visual information is presented after the automatic driving state is switched to the manual driving state. For example, the control unit 132 may control the presentation unit 134 such that the visual information is continuously presented from the first position to the second position after the automatic driving state is switched to the manual driving state. According to such a configuration, it is possible to prompt the driver who is performing the manual driving to perform the surroundings monitoring.

(4) Specific Example

First Specific Example

The present specific example is an example in which the visual information is presented when the automatic driving state is switched to the manual driving state in a situation in which there is another lane on a side of the driver seat 10 of the own lane. The present specific example will be described with reference to FIG. 3.

Figure 3:
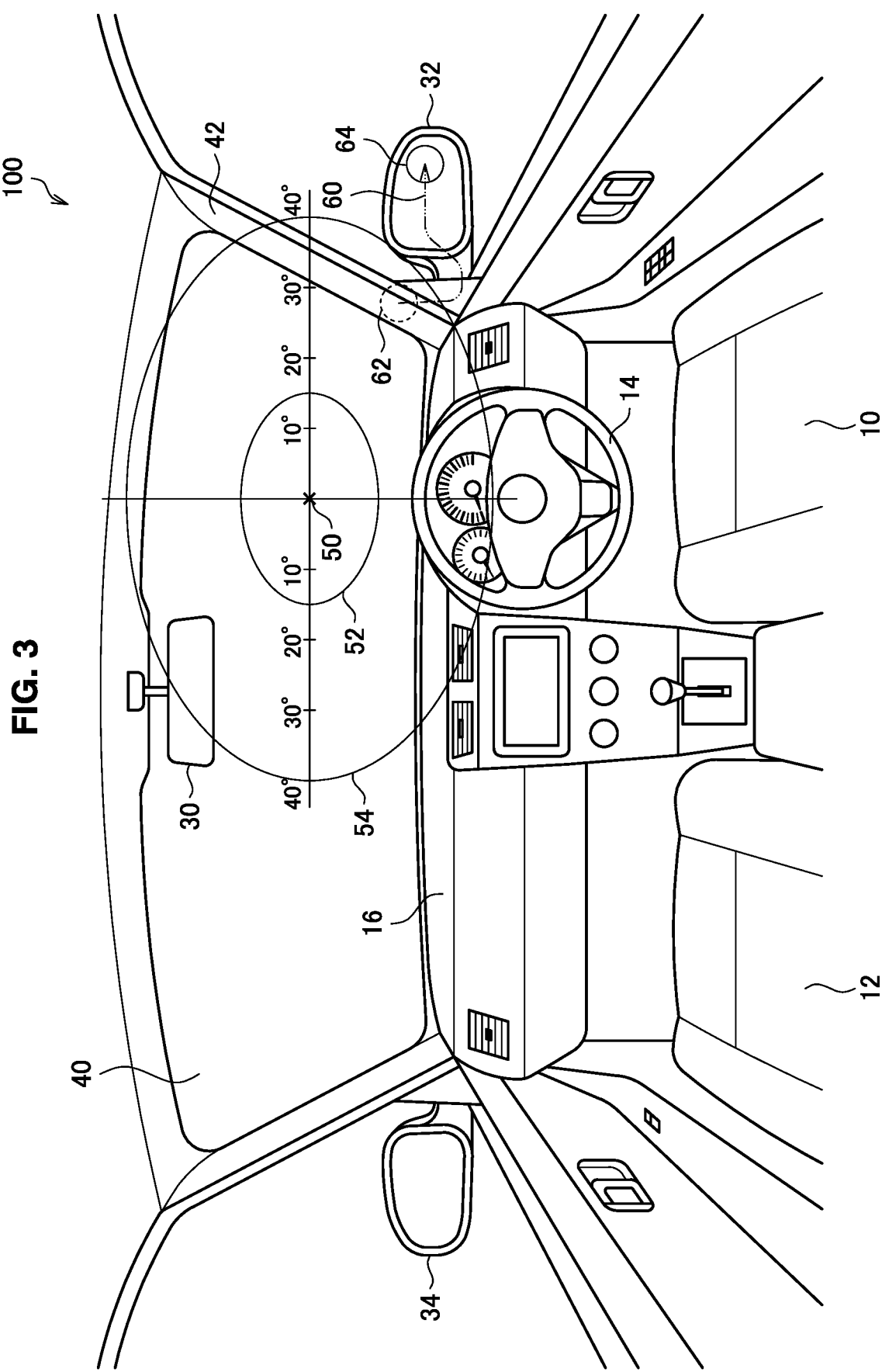
FIG. 3 is a view for explaining a first specific example.

FIG. 3 is a view for explaining a first specific example. As shown in FIG. 3, the control unit 132 may control such that the visual information is presented with a position 62 included in the A pillar 42 on a driver seat side as the first position and a position 64 included in the side mirror 32 on a driver seat side as the second position. For example, the control unit 132 controls the presentation unit 134 such that light is emitted as the visual information to quickly flow along a path 60 from the position 62 to the position 64. The position 62 is included in the stable field of fixation 54. Therefore, according to such a configuration, by continuously presenting the visual information from the position 62 in the stable field of fixation 54 to the position 64, it is possible to guide the visual line of the driver to the side mirror 32 on a driver seat side, on which the position 64 is superimposed.

As a result, it is possible to prompt the driver to check the lane on a right side of the own lane by the side mirror 32 on the driver seat side and to improve the safety. For example, even in a case in which a situation in which the vehicle 100 needs to change its lane, a situation in which another vehicle traveling on a right side of the own lane changes its lane to the own lane, or the like occurs immediately after the driving is switched to the manual driving, the driver will be able to respond safely.

The presentation of such visual information may be executed only in a situation in which it is necessary to check the lane on a right side of the own lane such as a situation in which the vehicle 100 needs to change its lane or a situation in which another vehicle is traveling on a right side of the own lane.

Second Specific Example

The present specific example is an example in which the visual information is presented when the automatic driving state is switched to the manual driving state in a situation in which there is another lane on a side of the passenger seat 12 of the own lane. The present specific example will be described with reference to FIG. 4.

Figure 4:
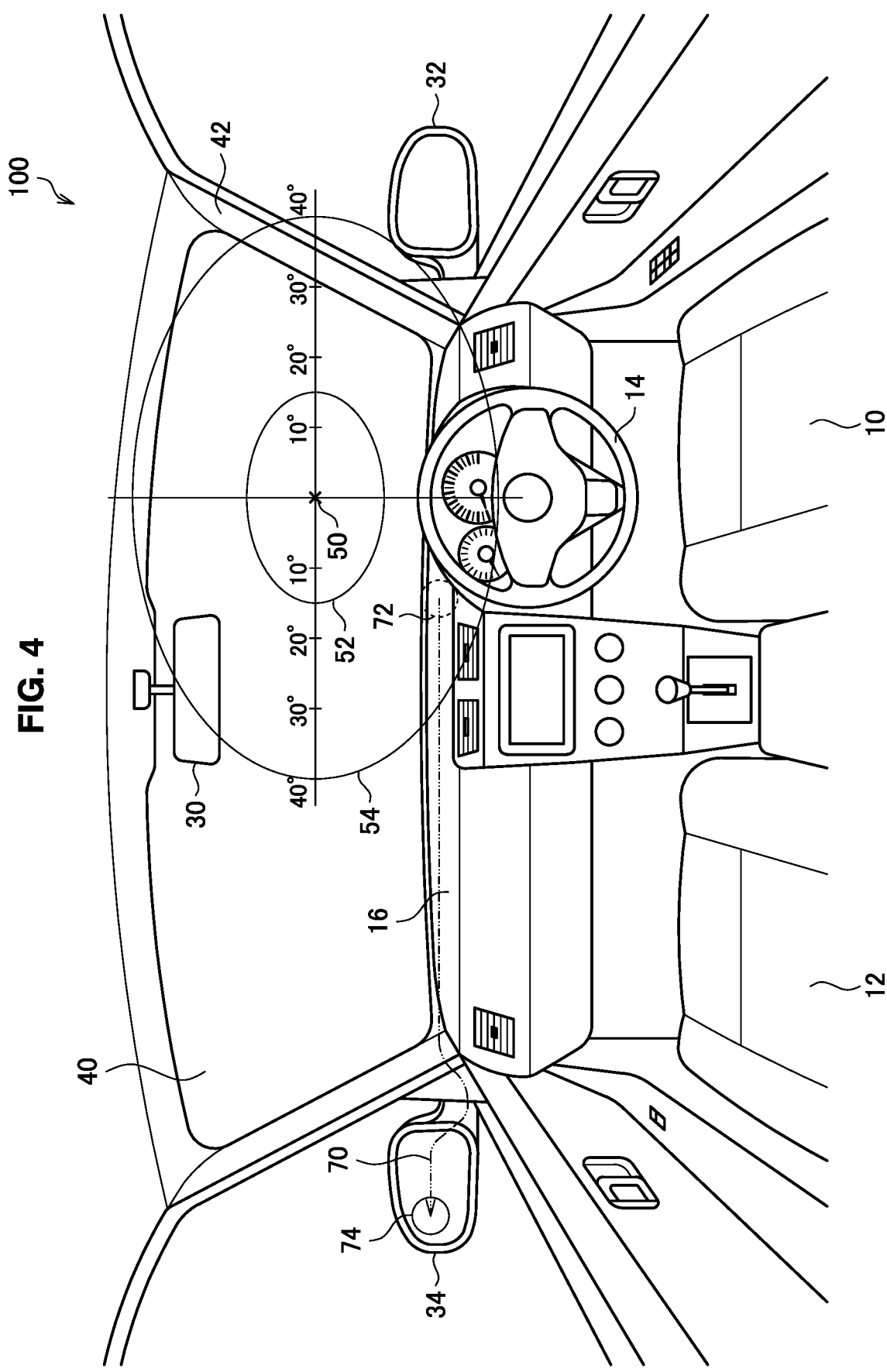
FIG. 4 is a view for explaining a second specific example.

FIG. 4 is a view for explaining a second specific example. As shown in FIG. 4, the control unit 132 may control such that the visual information is presented with a position 72 included in the instrument panel 16 as the first position and a position 74 included in the side mirror 34 on a passenger seat side as the second position. For example, the control unit 132 controls the presentation unit 134 such that light is emitted as the visual information to quickly flow along a path 70 from the position 72 to the position 74. The position 72 is included in the stable field of fixation 54. Therefore, according to such a configuration, by continuously presenting the visual information from the position 72 in the stable field of fixation 54 to the position 74, it is possible to guide the visual line of the driver to the side mirror 34 on a passenger seat side, on which the position 74 is superimposed.

As a result, it is possible to prompt the driver to check the lane on a left side of the own lane by the side mirror 34 on the passenger seat side and to improve the safety. For example, even in a case in which a situation in which the vehicle 100 needs to change its lane, a situation in which another vehicle traveling on a left side of the own lane changes its lane to the own lane, or the like occurs immediately after the driving is switched to the manual driving, the driver will be able to respond safely.

The presentation of such visual information may be executed only in a situation in which it is necessary to check the lane on a left side of the own lane such as a situation in which the vehicle 100 needs to change its lane or a situation in which another vehicle is traveling on a left side of the own lane.

Third Specific Example

The present specific example is an example in which the visual information is presented when the automatic driving state is switched to the manual driving state. The present specific example will be described with reference to FIG. 5.

Figure 5:
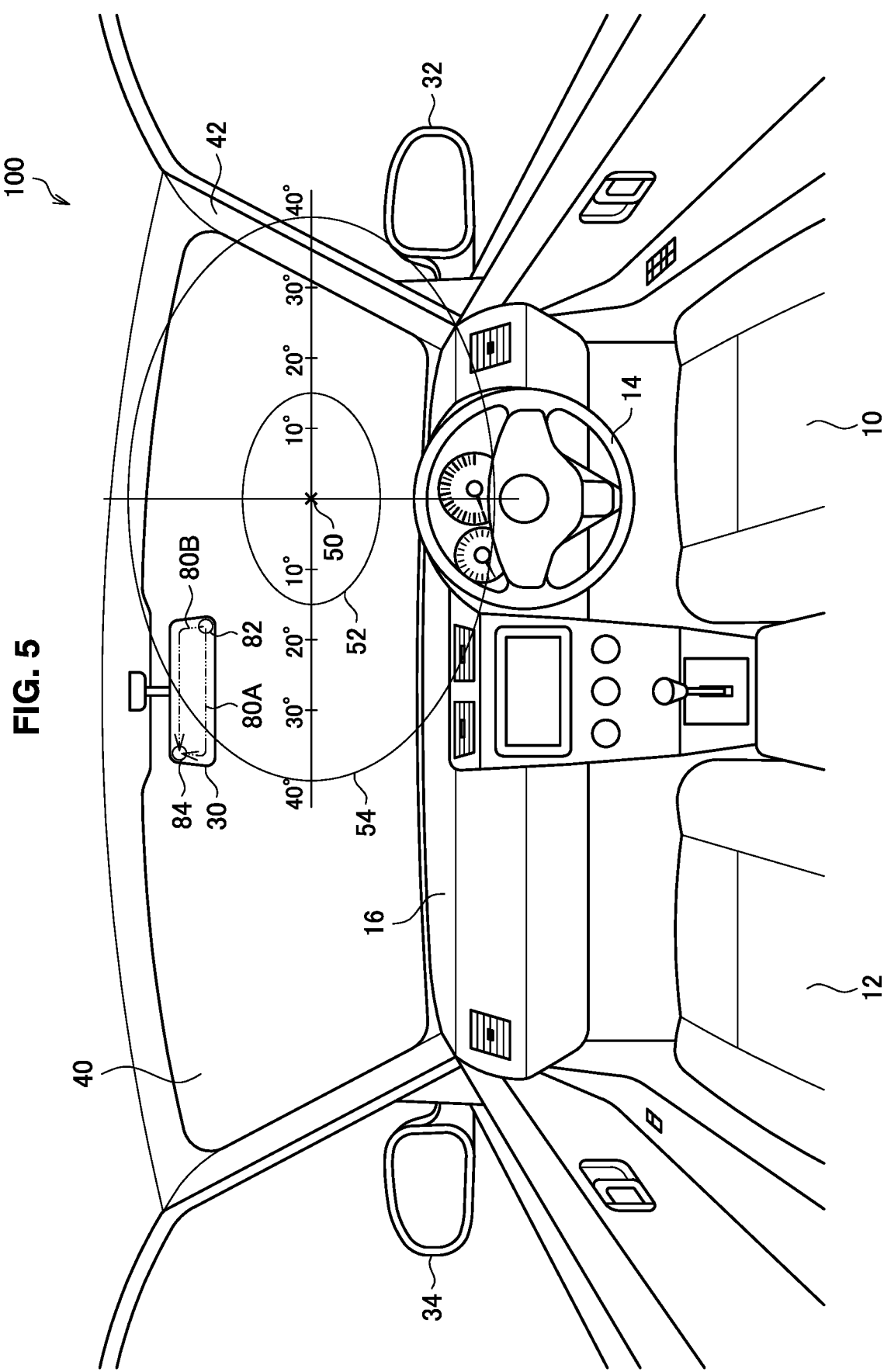
FIG. 5 is a view for explaining a third specific example.

FIG. 5 is a view for explaining a third specific example. As shown in FIG. 5, the control unit 132 may control such that the visual information is presented with a position 82 included in the rear-view mirror 30 as the first position and a position 84 farther away than the position 82 among positions included in the rear-view mirror 30 as the second position. For example, the control unit 132 controls the presentation unit 134 such that light is emitted as the visual information to quickly flow along a path 80A and a path 80B from the position 82 to the position 84, that is, through the entire frame of the rear-view mirror 30. The position 82 is included in the stable field of fixation 54. Therefore, according to such a configuration, by continuously presenting the visual information from the position 82 in the stable field of fixation 54 to the position 84, it is possible to guide the visual line of the driver to the rear-view mirror 30 on which the path 80 is superimposed.

As a result, it is possible to prompt the driver to check the rearward in the own lane by the rear-view mirror 30 and to improve the safety. For example, in a situation in which another vehicle is traveling in the rearward in the own lane, it is possible to prompt the driver not to perform dangerous driving to the other rearward vehicle behind such as sudden braking.

The presentation of such visual information may be executed only in a situation in which it is necessary to check the rearward of the own lane such as a situation in which another vehicle is traveling in the rearward in the own lane.

(5) Flow of Processing

FIG. 6 is a diagram showing an example of a flow of processing executed by the presentation system 130 according to the present embodiment.

As shown in FIG. 6, first, the control unit 132 determines whether or not the automatic driving state is switched to the manual driving state (step S102). For example, the control unit 132 makes such a determination by inquiring the operation executing unit 120 whether or not to switch. In a case in which it is determined that the automatic driving state is not switched to the manual driving state (step S102: NO), the processing waits until the switching is performed.

In a case in which it is determined that the automatic driving state is switched to the manual driving state (step S102: YES), the control unit 132 controls the presentation unit 134 such that the visual information is continuously presented from the first position included in the stable field of fixation to the second position (step S104). Then, the control unit 132 controls the presentation unit 134 such that the visual information is blinked at the second position (step S106). After that, the processing ends.

<<3. Supplement>>

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the above embodiment, it has been described that the position of the center of vision of the driver is estimated to be in front of the vehicle 100 with reference to the central position of the headrest of the driver seat 10, but the present invention is not limited to such an example. For example, the position of the center of vision of the driver may be estimated based on a state of the driver such as the visual line of the driver and a posture of the driver.

For example, the vehicle 100 is mentioned as an example of the operation target in the above embodiment, but the present invention is not limited to such an example. The operation target may be any moving body that moves in a real space. Examples of the moving bodies other than the vehicle 100 include airplanes and ships. Of course, the operation target is not limited to the moving body. For example, the operation target may be any device operated by the user, such as a robot and a construction machine. Further, the user may not have to be on board the operation target and may perform remote control. In addition, the operation target may be a virtual object such as a character operated by the user in a game.

The device described in the present specification may be realized as a single device, or a part or all of the device may be realized as a separate device. For example, FIG. 1 shows an example in which the control unit 132 is equipped in the vehicle 100 which is the operation target, but the present invention is not limited to such an example. The control unit 132 may be configured as another control device connected to the vehicle 100 via a network or the like.

Note that, a series of processes performed by the devices described in this specification may be achieved by any of software, hardware, and a combination of software and hardware. A program that configures software is stored in advance in, for example, a recording medium (non-transitory medium) installed inside or outside the devices. In addition, for example, when a computer executes the programs, the programs are read into random access memory (RAM), and executed by a processor such as a CPU. The recording medium may be a magnetic disk, an optical disc, a magneto-optical disc, flash memory, or the like. Alternatively, the above-described computer program may be distributed via a network without using the recording medium, for example.

Further, in the present specification, the processes described using the flowcharts and the sequence diagrams are not necessarily executed in the order illustrated in the drawings. Some processing steps may be executed in parallel. In addition, additional processing steps may be employed and some processing steps may be omitted.

What is claimed is:

1. A control device, comprising:
   a controller; and
   an operation executing controller,
   wherein the controller controls such that visual information is continuously presented from a first position to a second position, which is different from the first position, when a first state in which an operation target, which is a target to be operated by a user is operated by the operation executing controller, which operates the operation target instead of the user is switched to a second state in which the operation target is operated by the user, and
   wherein the controller controls a mode in which the visual information is blinked at the second position according to a distance between a center of vision of the user and the second position.

2. The control device according to claim 1,
   wherein the controller sets a position included in a stable field of fixation, which is a range within 45 degrees in left and right directions from the center of vision of the user, which is a center of a visual field of the user as the first position.

3. The control device according to claim 1,
   wherein the controller blinks the visual information at the second position.

4. The control device according to claim 1,
   wherein the controller controls such that the visual information is presented at a same time when information indicating that the first state is switched to the second state is notified to the user.

5. The control device according to claim 1,
   wherein the controller controls such that the visual information is presented before information indicating that the first state is switched to the second state is notified to the user.

6. The control device according to claim 1,
   wherein the controller controls such that the visual information is presented after information indicating that the first state is switched to the second state is notified to the user.

7. The control device according to claim 1,
   wherein the controller controls such that the visual information is presented before the first state is switched to the second state.

8. The control device according to claim 1,
   wherein the controller controls such that the visual information is presented after the first state is switched to the second state.

9. The control device according to claim 1,
   wherein the controller controls such that light emitted from a lighting device is presented as the visual information.

10. The control device according to claim 1,
    wherein the operation target is a moving body that moves in a real space.

11. The control device according to claim 10,
    wherein the operation target is a vehicle, and
    wherein the user is a driver who drives the vehicle.

12. The control device according to claim 11,
    wherein the controller controls such that the visual information is presented with a position included in a front pillar on a driver seat side of the vehicle as the first position and a position included in a side mirror on a driver seat side as the second position.

13. The control device according to claim 11,
wherein the controller controls such that the visual information is presented with a position included in an instrument panel of the vehicle as the first position and a position included in a side mirror on a passenger seat side as the second position.

14. The control device according to claim 11,
wherein the controller controls such that the visual information is presented with a position included in a rear-view mirror of the vehicle as the first position and a position farther away than the first position among positions included in the rear-view mirror as the second position.

15. A presentation system,. comprising:
a controller;
an operation executing controller; and
a lighting device that emits light,
wherein the controller controls the lighting device such that visual information is continuously presented from a first position to a second position, which is different from the first position, when a first state in which an operation target, which is a target to be operated by a user, is operated by the operation executing controller, which operates the operation target instead of the user, is switched to a second state in which the operation target is operated by the user, and
wherein the controller controls a mode in which the visual information is blinked at the second position according to a distance between a center of vision of the user and the second position.

16. A computer readable non-transitory storage medium in which a program is stored, the program causing a computer to execute
controlling, by a controller, such that visual information is continuously presented from a first position to a second position, which is different from the first position, when a first state in which an operation target, which is a target to be operated by a user, is operated by an operation executing controller, which operates the operation target instead of the user, is switched to a second state in which the operation target is operated by the user, and
wherein the controller controls a mode in which the visual information is blinked at the second position according to a distance between a center of vision of the user and the second position.

* * * * *